United States Patent
Baumgartner et al.

(10) Patent No.: US 7,896,141 B2
(45) Date of Patent: Mar. 1, 2011

(54) DISC BRAKE WITH ELECTRICALLY OPERATED ADJUSTMENT DEVICE

(75) Inventors: Johann Baumgartner, Moosburg (DE); Dieter Bieker, Oberaudorf (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 307 days.

(21) Appl. No.: 10/503,993

(22) PCT Filed: Jan. 31, 2003

(86) PCT No.: PCT/EP03/00962

§ 371 (c)(1),
(2), (4) Date: Mar. 10, 2005

(87) PCT Pub. No.: WO03/067114

PCT Pub. Date: Aug. 14, 2003

(65) Prior Publication Data

US 2005/0150729 A1 Jul. 14, 2005

(30) Foreign Application Priority Data

Feb. 8, 2002 (DE) .............................. 102 05 451
Jun. 19, 2002 (DE) .............................. 102 27 271

(51) Int. Cl.
*F16D 65/16* (2006.01)

(52) U.S. Cl. .............. 188/73.46; 188/73.45; 188/73.41; 188/72.9; 188/71.9

(58) Field of Classification Search .............. 188/73.41, 188/73.42, 73.39, 72.9, 71.9, 73.44, 73.45, 188/73.46

See application file for complete search history.

(56) References Cited

U.S. PATENT DOCUMENTS

| 2,533,186 | A | * | 12/1950 | Bricker et. al. ........... 188/73.41 |
| 3,005,522 | A | * | 10/1961 | Butler ....................... 188/72.6 |
| 3,478,845 | A | * | 11/1969 | Kita .......................... 188/73.41 |
| 6,585,086 | B2 | * | 7/2003 | Ortegren et al. .......... 188/73.32 |

FOREIGN PATENT DOCUMENTS

| DE | 3610569 C2 | 10/1987 |
| EP | 0688404 B1 | 12/1995 |

* cited by examiner

*Primary Examiner*—Bradley T King
(74) *Attorney, Agent, or Firm*—Crowell & Moring LLP

(57) ABSTRACT

A disc brake, in particular for commercial vehicles with a pivoting or displaceable brake caliper, an actuation device and at least one adjustment device on both sides of the brake disc is characterized in that the brake caliper comprises bearing housings on the underside thereof, whereby support elements, arranged on the wheel axle, engage in the bearing housings. At least one elastically-deformable spacer element is provided between bearing housing and support element.

32 Claims, 13 Drawing Sheets

DISC BRAKE WITH ELECTRICALLY OPERATED ADJUSTMENT DEVICE

BACKGROUND AND SUMMARY OF THE INVENTION

The invention relates to a disc brake, particularly for commercial vehicles, having a single-part or multi-part caliper, which reaches over a brake disc and can be swivelled or slid relative to a wheel axle or hub, and having a brake application device arranged in the caliper for applying the brake.

From European Patent document EP 0 688 404 B1, a sliding-caliper disc brake is known, where a brake application device with a rotary lever is arranged on one side of the caliper, which lever is disposed to be pivoted about an axis of rotation extending parallel to the plane of the brake disc. Facing the brake disc, this rotary lever rests, by means of an eccentric, against a transverse member which is slidably guided with respect to the brake disc and in which two adjusting screws provided with an external thread are adjustably screwed in a parallel arrangement.

From German Patent document DE 36 10 569 C2, a sliding-caliper disc brake is also known, where a rotary lever has one eccentric respectively at two ends, each eccentric engaging with a set bolt in order to press a brake shoe or a brake pad against the brake disc when a piston rod is actuated by a cylinder which can be acted upon by a pressure medium.

In this case, the sliding-caliper brake caliper is designed such that, by means of the sliding path, the working stroke of the brake during each braking as well as the maximal wear displacement of the brake pads, that is, the adjusting path of the brake, can be bridged. For adjusting the brake pad wear, an adjusting device is used, which is arranged on one side of the brake disc.

Swivellable disc brakes of the above-mentioned type are also known. Similar to the above-mentioned sliding caliper disc brakes, here the swivelling angle must be dimensioned such that it becomes possible, in the area of the brake pads, to bridge the path of the working stroke in order to place the reaction-side brake pad against the brake disc and to compensate the brake pad wear occurring over time by means of the swivelling of the caliper. In this case, the caliper has the task of absorbing the tension forces upon the brake pads; of simultaneously guiding the brake pads; and of transmitting their circumferential forces by way of the fastening and pivot bearing of the caliper to the axle. A disadvantage of such hinged-caliper brakes is the swivelling-out of the caliper mainly at a full wear displacement. This disadvantage becomes particularly clear on the disc side situated opposite the caliper bearing, requiring a smaller outside disc diameter and a smaller brake pad thickness in comparison to fixed-caliper or sliding-caliper brakes.

In light of this background, it is an object of the invention to further develop a disc brake of the above-mentioned type such that a particularly robust and maintenance-free design of the swivelling mechanism or swivel bearing of the caliper is implemented, in which case only the working stroke has to be moved.

The invention achieves this task by providing a disc brake, having: a) a one-part or multi-part caliper, which straddles a brake disc and can be swivelled or slid relative to a wheel axle or wheel hub; b) a brake application device arranged in the caliper for applying the brake; c) at least one adjusting device, respectively, on each side of the brake disc, and preferably one electromotive or mechanical drive respectively acting upon the adjusting device; d) wherein the caliper has supporting elements particularly on its lower side pointing toward the wheel axle in the installed condition, and wherein bearing housings are arranged on the wheel axle or wheel hub; and e) wherein at least one elastically deformable intermediate element is arranged between the bearing housing and the associated supporting element, which intermediate element engages in at least one bearing housing. The supporting element is, in each case, movable relative to the bearing housing such that the swivelling angle or the sliding path of the caliper permits a bridging of the maximal working stroke of the disc brake in the area of the brake pads.

The invention provides a disc brake, particularly a pneumatically operated or electromechanically operated disc brake, in the case of which at least one adjusting device, respectively, is arranged on both sides of the brake disc. In particular, at least one adjusting rotary device is arranged on each side of the brake disc, preferably with an electromotive or mechanical drive acting upon the adjusting rotating device.

In this case, the caliper, particularly at a lower side pointing toward the wheel axle in an installed position, is provided with one, preferably two bearing housings, and at least one or two supporting elements are arranged on the wheel axle or hub.

In addition, at least one elastically deformable intermediate element may be respectively provided or arranged between the bearing housing and the supporting element, which intermediate element engages in the at least one bearing housing at the caliper.

As an alternative, it is also contemplated that the caliper has supporting elements on its lower side pointing toward the wheel axle in the installed position, and bearing housings are arranged at the wheel axle or hub, in which case at least one elastically deformable intermediate element is respectively provided/arranged between the bearing housing and the supporting element, which intermediate element engages in the at least one bearing housing.

In the case of this type of sliding or swivel bearing, as a result of the adjusting devices being provided on both sides of the brake disc, the brake pad wear need not be compensated by the sliding or swivelling movement but rather by the two adjusting devices which, in the case of wear, advance the brake pads on both sides of the brake disc closer toward the brake disc. As a result, it becomes possible to limit the sliding path or the swivelling angle of the hinged caliper such that in each case only the maximal working stroke can be bridged in the area of the brake pad via the swivelling movement.

The supporting element can, in each case, preferably be moved relative to the bearing housing such that the swivelling angle or the sliding path of the caliper permits a bridging of the maximal working stroke of the disc brake in the area of the brake pads.

Particularly preferably, the supporting elements, in each case, engage in one of the bearing housings, the elastic intermediate elements each being arranged between the supporting elements and the bearing housings. This is a constructively easily implementable variant of the invention, which can be supplemented particularly advantageously in that the elastic intermediate elements have a bush shape and/or consist of a cost-effective elastomer.

Expediently, two of the supporting elements are arranged on—particularly shaped onto—the wheel axle or hub, especially on an axle ring. It can be implemented in a constructively simple manner and is cost-effective for the supporting elements to have a bolt-shaped construction and to be shaped onto the wheel axle or wheel hub by using one of their ends.

This can optionally also be combined with a displaceable disc, which is arranged on the wheel axle, to be displaceable by a portion of the working stroke. This permits an even smaller sizing of the sliding path or of the swivelling angle.

Further, as a result of the elastic bearing between the bearing housing and the supporting element, a "pivot bearing" in the actual sense of the word is avoided in the case of the hinged caliper, which permits, on the one hand, a cost-effective implementation of the hinged-caliper function and, on the other hand, a particularly robust design.

In the case of a sliding-caliper brake, it is expedient for the bearing recesses, the supporting element and the elastic intermediate element to each be aligned such that, in each case, an elastic bearing is constructed which is aligned coaxially with respect to the brake disc axis.

In contrast, in the case of a hinged-caliper brake, it is advantageous to construct one elastic bearing, respectively, which is aligned perpendicular to the brake disc axis.

Preferably, the supporting element can in each case be moved relative to the bearing housing such that the swivelling angle or the sliding angle of the caliper (preferably only) permits a bridging of the maximal working stroke of the disc brake in the area of the brake pads.

In that the free ends of two of the supporting elements are arranged as an extension of a chord through the axle ring at the two intersections of the chord with the axle rings and point away from one another with their free ends, a construction can be created which is as stable as possible and nevertheless, by using simple devices, the necessary swivelling motion can be implemented.

Particularly preferably, the supporting elements have radial contact surfaces which, with a small play, are in contact, which directly transmits the radial forces, with corresponding opposite surfaces of the bearing housings. This results in a particularly good support against forces which may rotate the caliper.

In another, particularly preferred, embodiment, at least one intermediate element is constructed in a cost-effective manner as a rubber-metal composite part.

The bearing housing and the supporting element may definitely be in contact in areas. It is important that, in sections, an elastic intermediate element is nevertheless arranged between the two elements.

Advantageous further developments of the invention are described and claimed herein.

BRIEF DESCRIPTION OF THE DRAWINGS

In the following, the invention will be explained in detail with reference to the attached figures.

DETAILED DESCRIPTION OF THE DRAWINGS

First, the basic construction of the disc brake according to FIG. 14 will be described in order to explain, as an example, the construction of a disc brake with adjusting devices on both faces of the brake disc.

Figure 14:
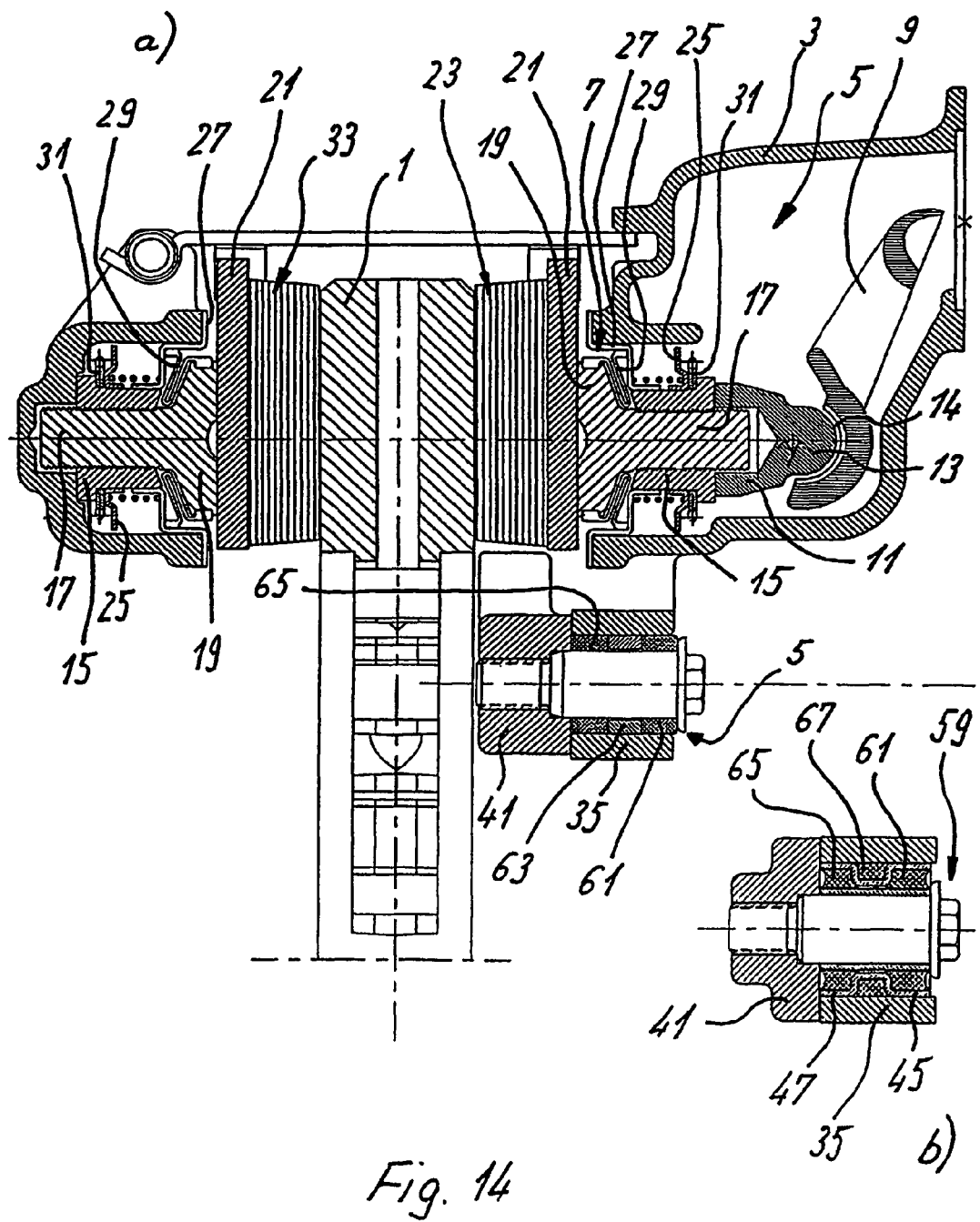
FIG. 14a is a sectional view of another disc brake.
FIG. 14b is a sectional view of a changed connection area of the caliper of FIG. 14 on the axle ring.

FIG. 14 is a sectional view of a sliding-caliper disc brake having a caliper 3 reaching over a brake disc 1, the caliper being a one-piece caliper in this case.

As an alternative, the caliper 3 may also be constructed in two (or more) parts (not shown here), the two caliper parts then being preferably connected with one another by means of bolts or studs. Preferably, one of the two caliper parts frames the brake disc in its upper circumferential area, and the other caliper part is used for receiving a brake application device, which permits a simple adaptation of the brake to application devices of many different constructions.

On one side of the brake disc 1, a brake application device 5 is arranged in the caliper 3, which application device 5 can be inserted (also completely or partially preassembled) into the caliper 3 that faces an opening 7 of the caliper 3 pointing toward the brake disc.

The application device 5 has a rotary lever 9, which can be operated by a piston rod (not shown here), and which is supported on the caliper 3 by way of bearing elements, (also not shown here) such as ball bearings and additional bearing shells.

On its side facing away from the caliper 3, the rotary lever 9 acts at a center point—or preferably at two lateral ends—in each case upon an intermediate or supporting element 11, which has a hemispherical attachment 13 at its end facing the rotary lever 9. A sliding bearing shell 14 is arranged here between the attachment 13 and the rotary lever 9.

The intermediate element 11 is supported on the face of an adjusting nut 15, into which an adjusting screw 17 is inserted, particularly screwed-in, which adjusting screw 17 carries a thrust piece 19 at its end facing away from the rotary lever 1. The thrust piece 19 rests on a pad holding plate 21 of an application-side brake pad 23.

If the rotary lever 9 is swivelled by advancing the piston rod, the lower eccentric-type end (not illustrated here) of the rotary lever 9 causes an advancing of the intermediate element 11 in the direction of the brake disc 1. In this case, the adjusting nut 15 and the adjusting screw 17 are also pressed in the direction of the pressure pad 23 and the application-side pressure pad 23 is displaced in the direction of the brake disc 1.

The adjusting nut 15 and the adjusting screw 17 are inserted into two holding plates 25, 27. A bellows-type seal 29 seals-off the space between one holding plate 25 and the thrust piece 19 against a penetration of dirt and moisture.

On the adjusting nut 15, a gear wheel 31 is fastened in a non-rotatable manner relative to the adjusting nut. By way of additional transmission members, such as additional gear wheels, the gear wheel 31 can be operated particularly by an electric motor (not illustrated here) in order to compensate the brake pad wear cause by the braking action.

When the adjusting nut 15 is rotated, the adjusting screw 17 is axially moved relative to the adjusting nut 15, and thus the release play between the brake pad 23 and the brake disc 1 is changed. As an alternative, an operation is contemplated by way of a coupling mechanism connected between the rotary lever 9 and the adjusting nut 15 (not shown here).

Two of the adjusting rotary drives consisting of the adjusting nut 15 and the adjusting screw 17 are preferably arranged side-by-side at one side of the brake application device, so that the brake pad is acted upon by pressure at two points.

Two additional adjusting rotary drives, with a preferably separate electromotive drive, are arranged on the opposite side of the brake disc 1, i.e., the reaction side, in the caliper 3, which reaction side faces away from the brake application device. These adjusting rotary drives also each have an adjusting nut 15 and an adjusting screw 17, which permit the displacing of the thrust piece 19 in the direction of the brake pad 33 arranged on the reaction side of the brake disc 1, in the direction of the brake disc 1.

The adjusting of the release play preferably occurs in a computer-controlled manner.

Since at least one separate adjusting device respectively—here, consisting of two adjusting rotary drives with an electromotive drive respectively—are arranged on each face of the brake disc 1, the caliper 3 can be constructed here has a sliding or hinged caliper whose sliding path or swivelling angle is dimensioned such that—by means of the sliding path or swiveling angle—less than the maximal adjusting path (more specifically even just the maximal working stroke) during the application of the brake can be bridged.

For this purpose, the caliper 3 is fastened on a wheel axle or wheel hub in a swivellable or slidable manner relative to the latter. In addition, the brake disc 1 can also be slidably fastened to the wheel axle or wheel hub.

Since the sliding path or swivelling angle to be bridged is smaller than the sliding path or the swivelling angle which a comparable caliper according to the prior art had to bridge, in the case of which an adjusting device was arranged on only one side of the brake disc 1, the surprising possibility is obtained of implementing the slidability or the swivellability by using an elastic linkage between the caliper and the wheel hub or wheel axle.

Figure 1:
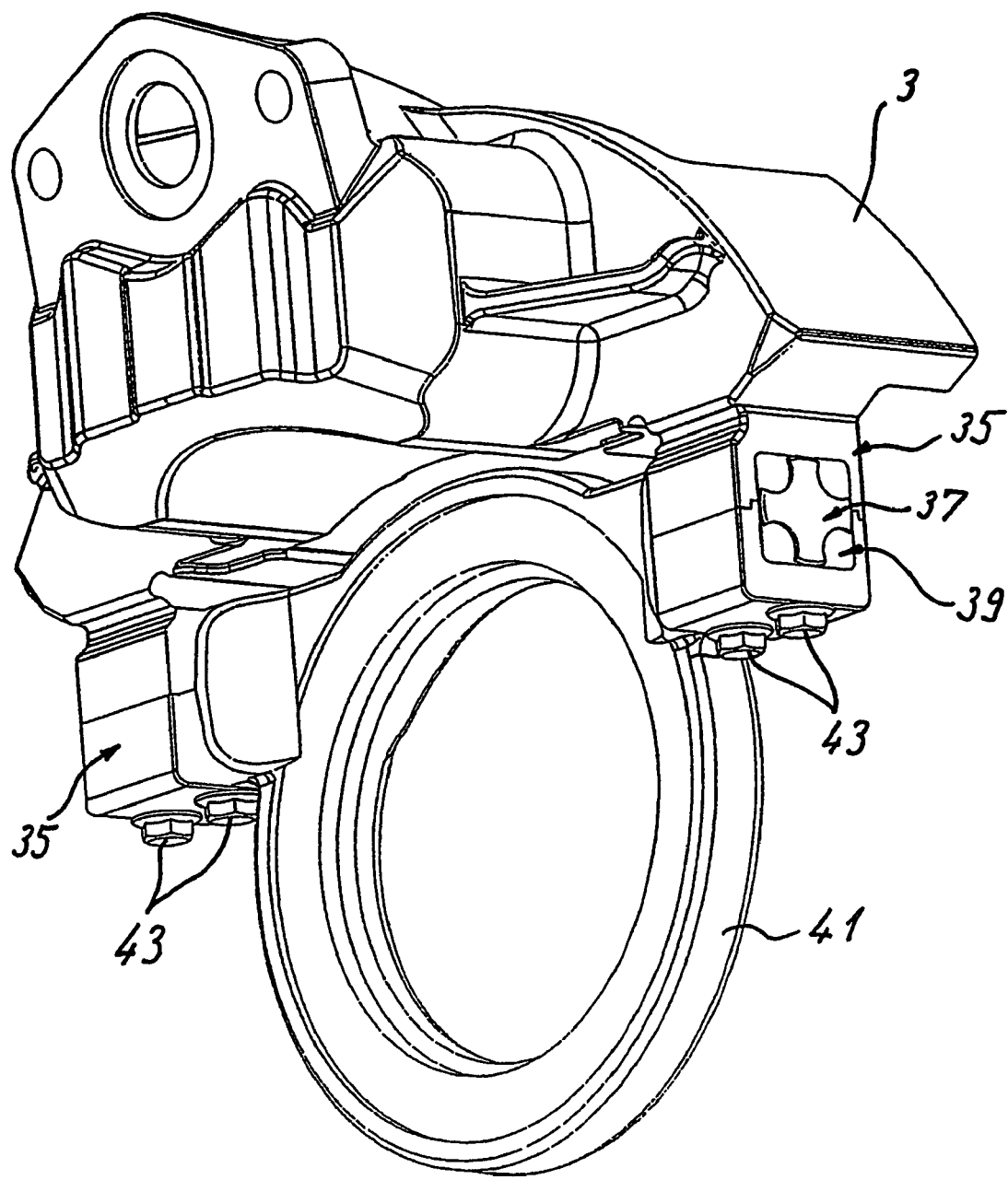
FIG. 1 is a perspective view of a first embodiment of a hinged-caliper disc brake on a hub ring.
Figure 2:
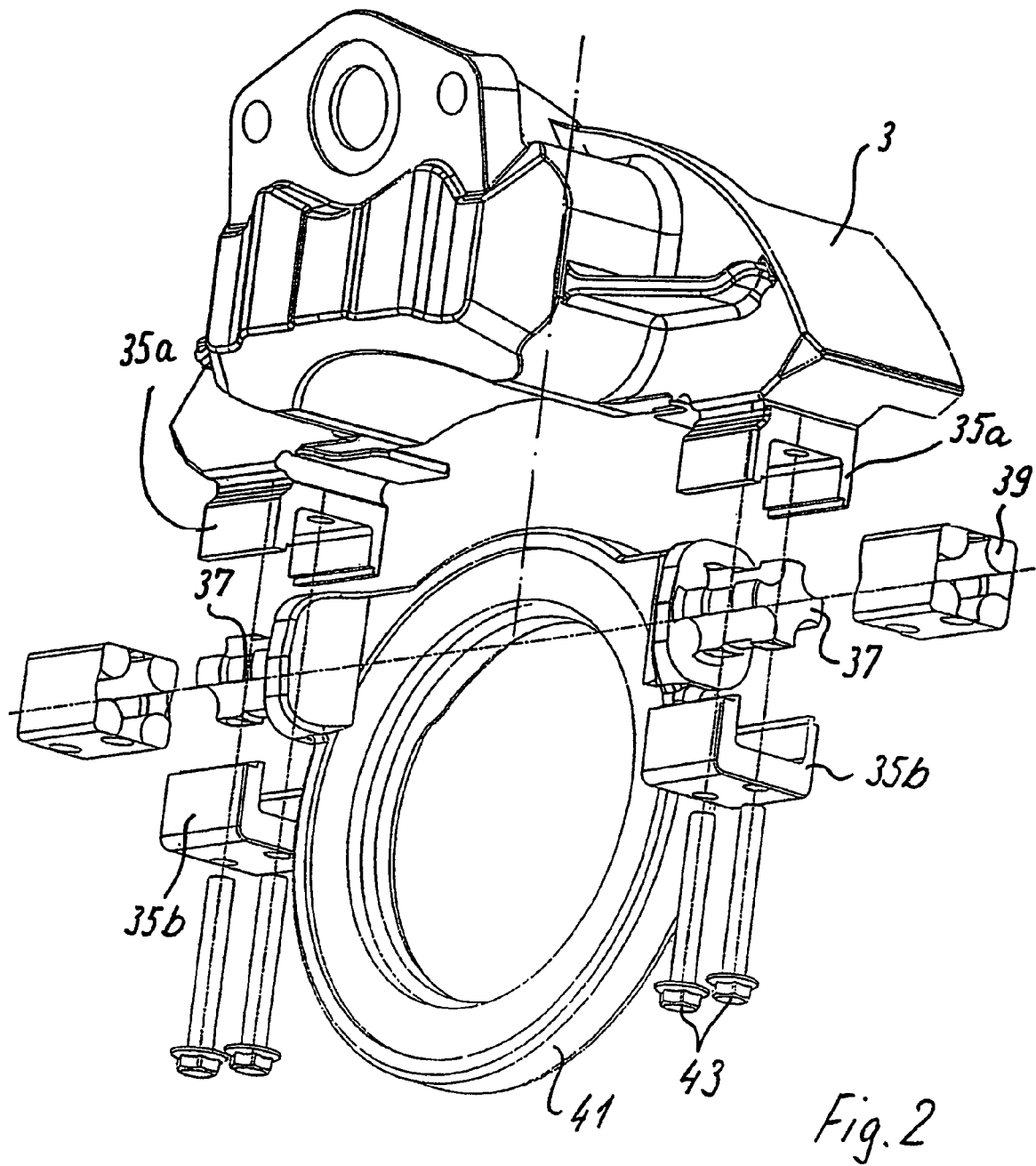
FIG. 2 is an exploded view of the hinged-caliper disc brake of FIG. 1.
Figure 3:
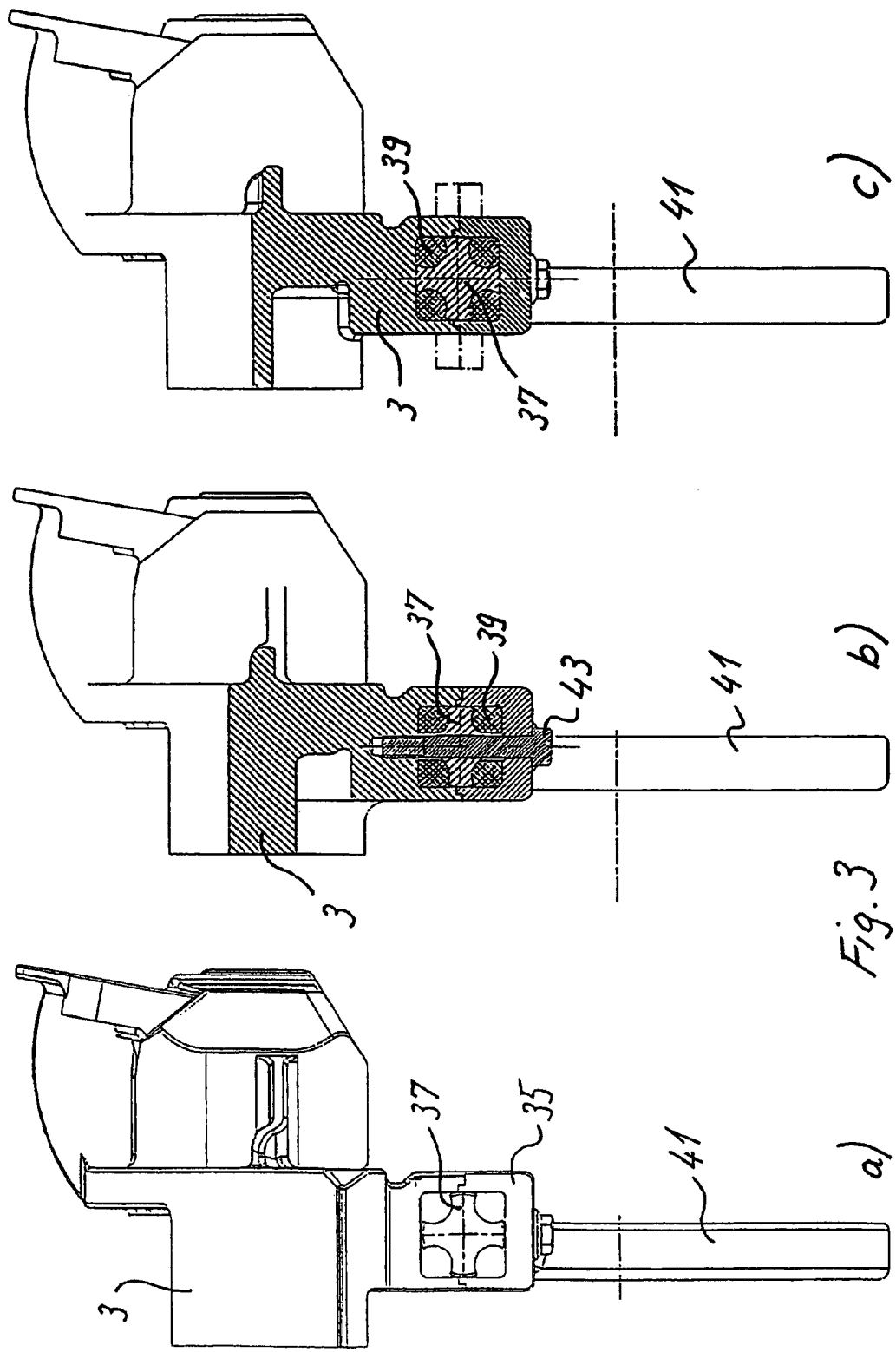
FIGS. 3a-3c include a lateral view, as well as two sectional views of the hinged-caliper disc brake of FIG. 1.

According to FIGS. 1 and 3, the caliper 3 has at least one, preferably two, bearing housings 35 arranged at a lower end side pointing toward the wheel axle in the installed condition, and at least one, preferably two, supporting elements 37 that are arranged on the wheel axle or the wheel hub. In each case, at least one elastically deformable intermediate element 39 is arranged/provided between the bearing housing 15 and the supporting element 37. The supporting elements 37 each engage in recesses or bores of the intermediate elements 39.

A reverse arrangement—not shown here—is also contemplated, in which the caliper has the supporting elements, and the bearing housings are arranged on the wheel axle or wheel hub. At least one elastically deformable intermediate element respectively is provided/arranged between the bearing housing and the supporting element, which intermediate element engages in the at least one bearing housing.

If, for example, the swivelling is not implemented by way of conventional pivot bearings but by way of an elastic linkage between the caliper and the axle, the problem occurs that the caliper 3 is to be easily movable in the swivelling direction, if possible, without any resistance, in which case, on the other hand, a high stiffness is required in the circumferential direction for absorbing the circumferential forces. Since the circumferential forces—caused by the installation conditions at the vehicle axles—interfere at a relatively large distance from the swivelling pivot of the caliper, they cause a tilting of the caliper 3 with respect to the brake disc 1 because of the existing elasticity, which results in an extremely excessive and non-uniform wear of the brake pads and, possibly, damage to brake components.

These problems are also avoided by means of the invention in preferred embodiments.

Thus, a high stiffness of the support can be achieved by using the two supporting elements 37—particularly if these supporting elements 37 are spaced a large distance apart from one another and, possibly also if a direct force transmission from the bearing housings 35 of the caliper 3 to the supporting elements 37 occur—, while the swivelling movement can be achieved with only a low resistance by using the elastic deformation of the intermediate elements 39.

In this regard, reference is again made to FIG. 1.

As illustrated, one of the supporting elements 37 respectively is constructed on an axle ring 41, which can be fastened to a wheel axle or wheel hub (or itself can represent a part of these elements) in the upper lateral circumferential area at mutually opposite points on the axle ring, which is also easily visible in the exploded view of FIG. 3.

These supporting elements 37 have an essentially bolt-type shape and, here, a cross-shaped cross-section. They are aligned to face away from one another; that is, they are situated at two mutually spaced circumferential points of the axle ring 41, in each case, virtually as an extension of a cord through the axle ring, and in the process point away from one another by means of their free ends by 180°.

The bearing housings 35 are arranged at corresponding—here, lower—mutually spaced points of the caliper 3. For facilitating the mounting, they are each constructed in two parts and consist of first bearing recess sections 35a, which are in each case cast directly onto the caliper 3, as well as of additional bearing recess sections 35b.

The bearing recess sections 35a and 35b each have a cross-section which is U-shaped in a lateral view. In the assembled condition, the interior of the bearing housings 35 here has a rectangular cross-section. The supporting elements 37 each engage in the bearing housings 35 at the caliper 3.

By the use of two studs or bolts 43 respectively, which penetrate the second bearing recess sections 35b as well as the supporting elements 37, the second bearing recesses 35b, which are on the bottom in FIG. 1, and the supporting elements 37 can be screwed to the first bearing recesses 35a. In this case, the studs also penetrate the elastically deformable intermediate elements 39, which are constructed in the shape of a bushing, whose interior contour is adapted to the outside diameter of the supporting elements 37; that is, the intermediate-element bushes, which have a rectangular or, here, even a square outer cross-section, have an essentially cross-shaped inner cross-section. The studs are dimensioned such that the required relative movement between the structural members can be implemented for sliding or swivelling the caliper 3.

In this case, the dimensioning takes place such that the supporting elements 37 have radial contact surfaces which are in a direct, radial-force-transmitting contact with a slight play with corresponding opposite surfaces of the bearing housings. Thus, the supporting elements 37 are constructed at the radial outer circumference of the cross shape in each case in a slightly rounded fashion. As a result of the large supporting width of the resulting two swivel zones between the supporting elements 37 and the bearing recesses 35, a particularly good support is obtained against forces which may rotate the caliper 3 about its vertical axis.

Figure 4:
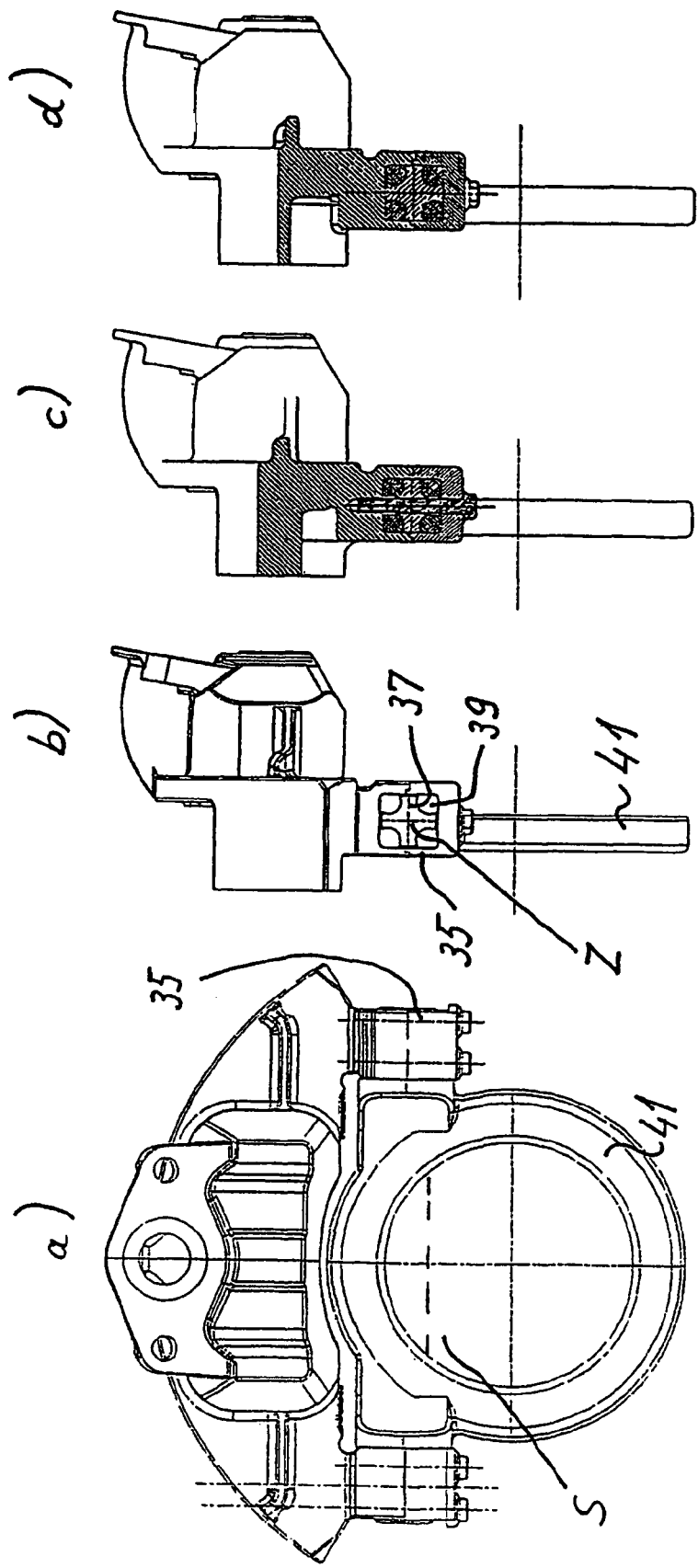
FIGS. 4a-4d include a rear view, as well as a reduced representation of the three cutouts of FIG. 3.
Figure 5:
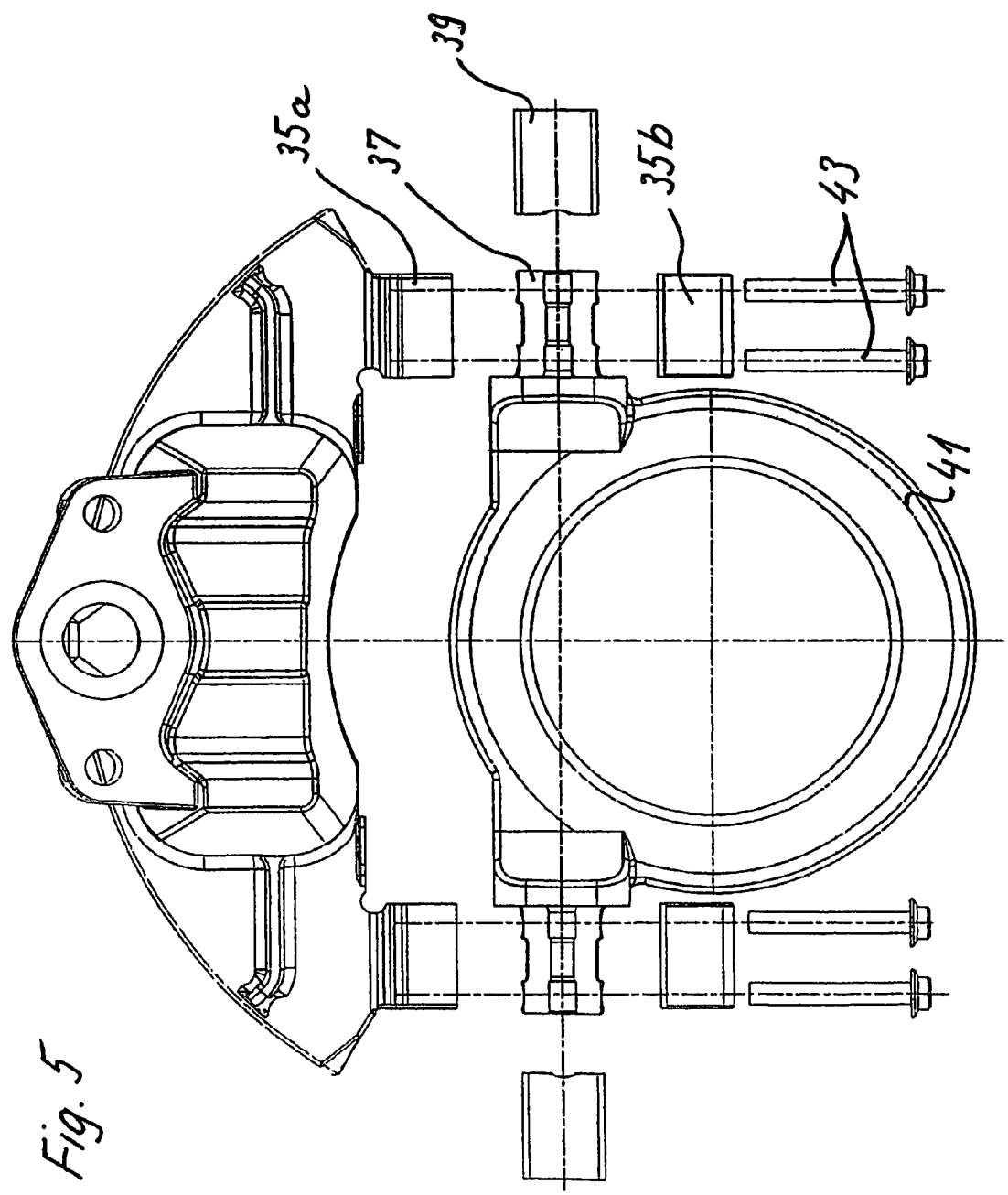
FIG. 5 is another exploded view of the elements of FIG. 2.
Figure 6:
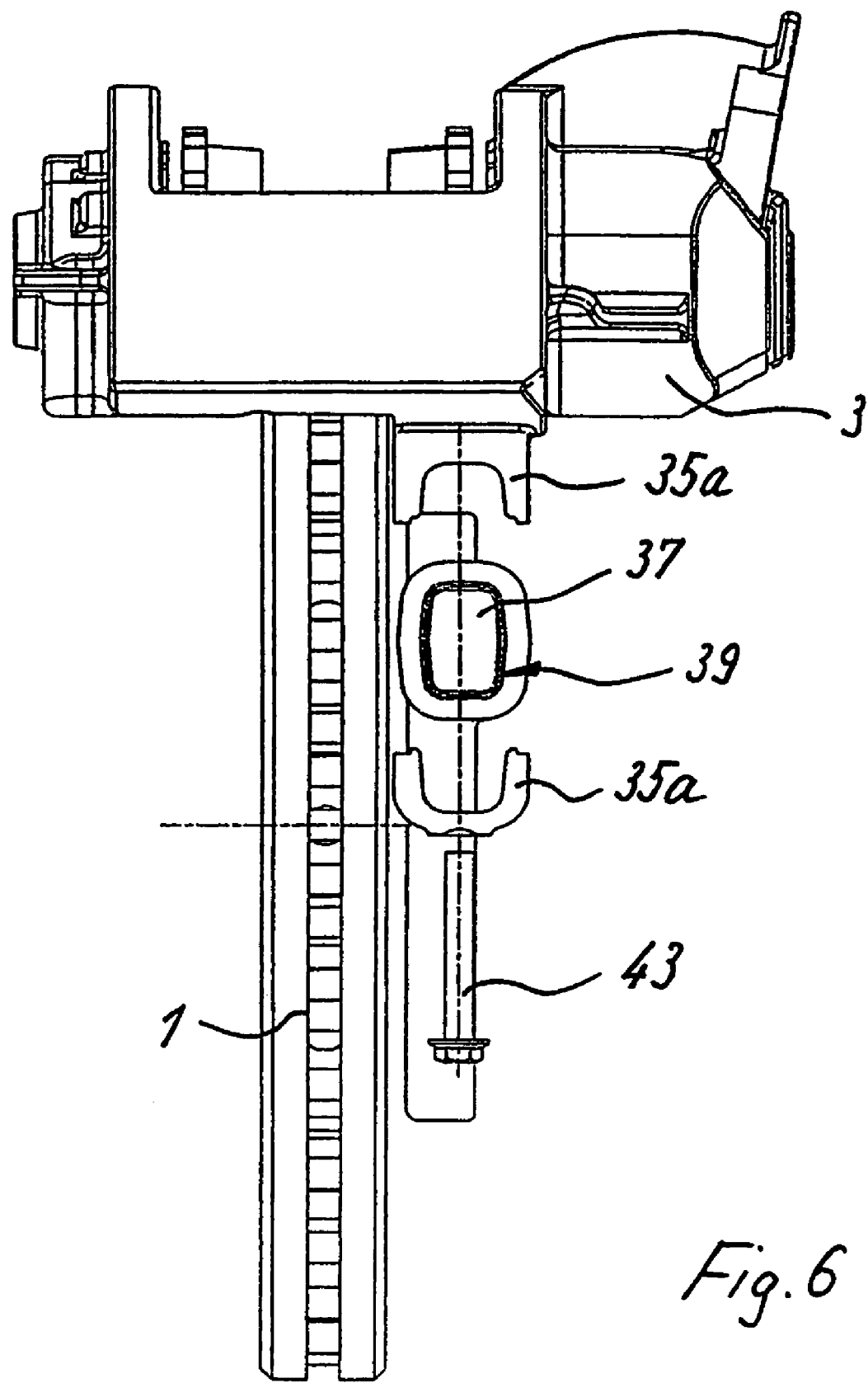
FIG. 6 is a lateral view of another embodiment of the invention.
Figure 7:
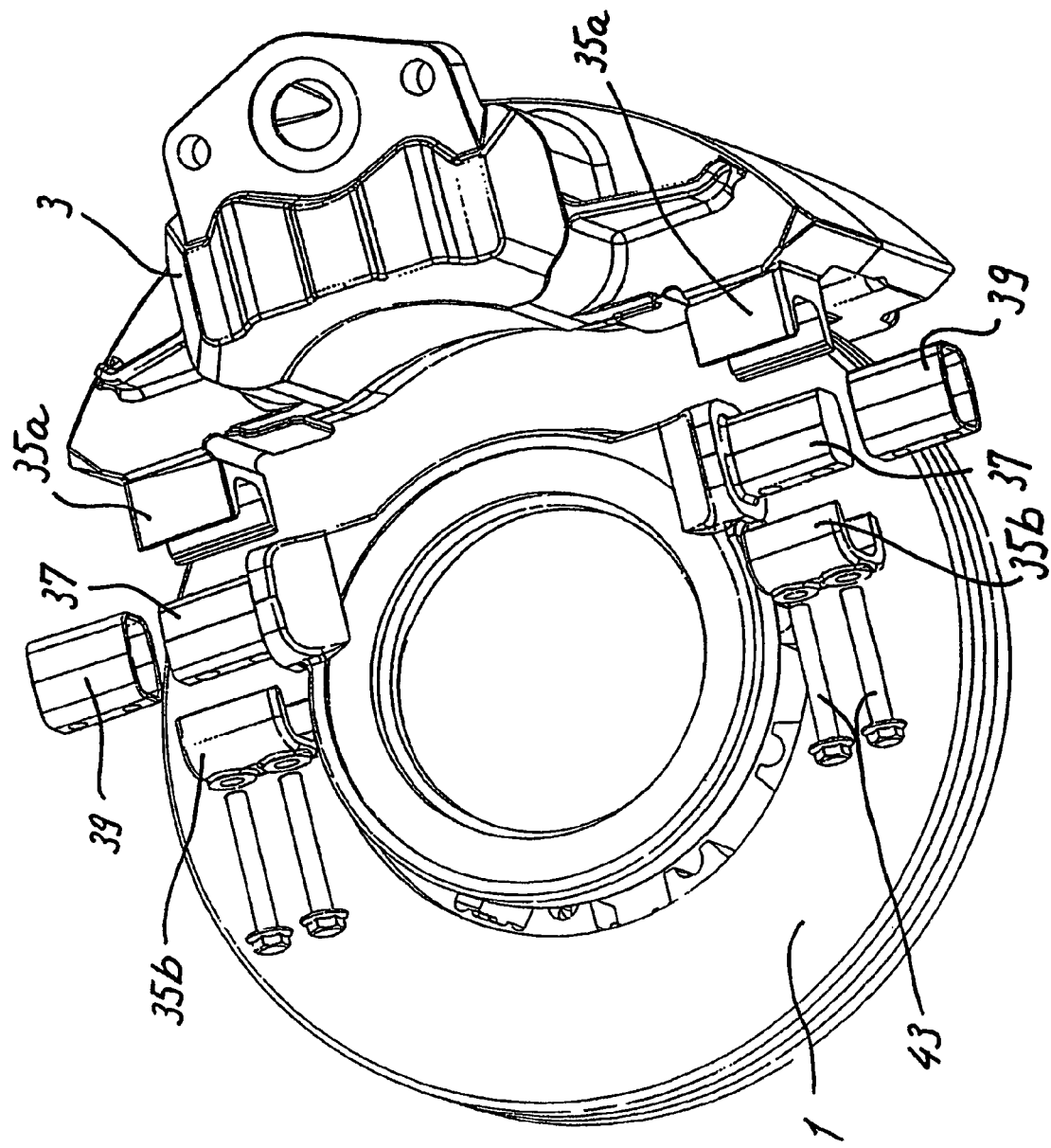
FIG. 7 is an exploded view of the embodiment of FIG. 6.
Figure 8:
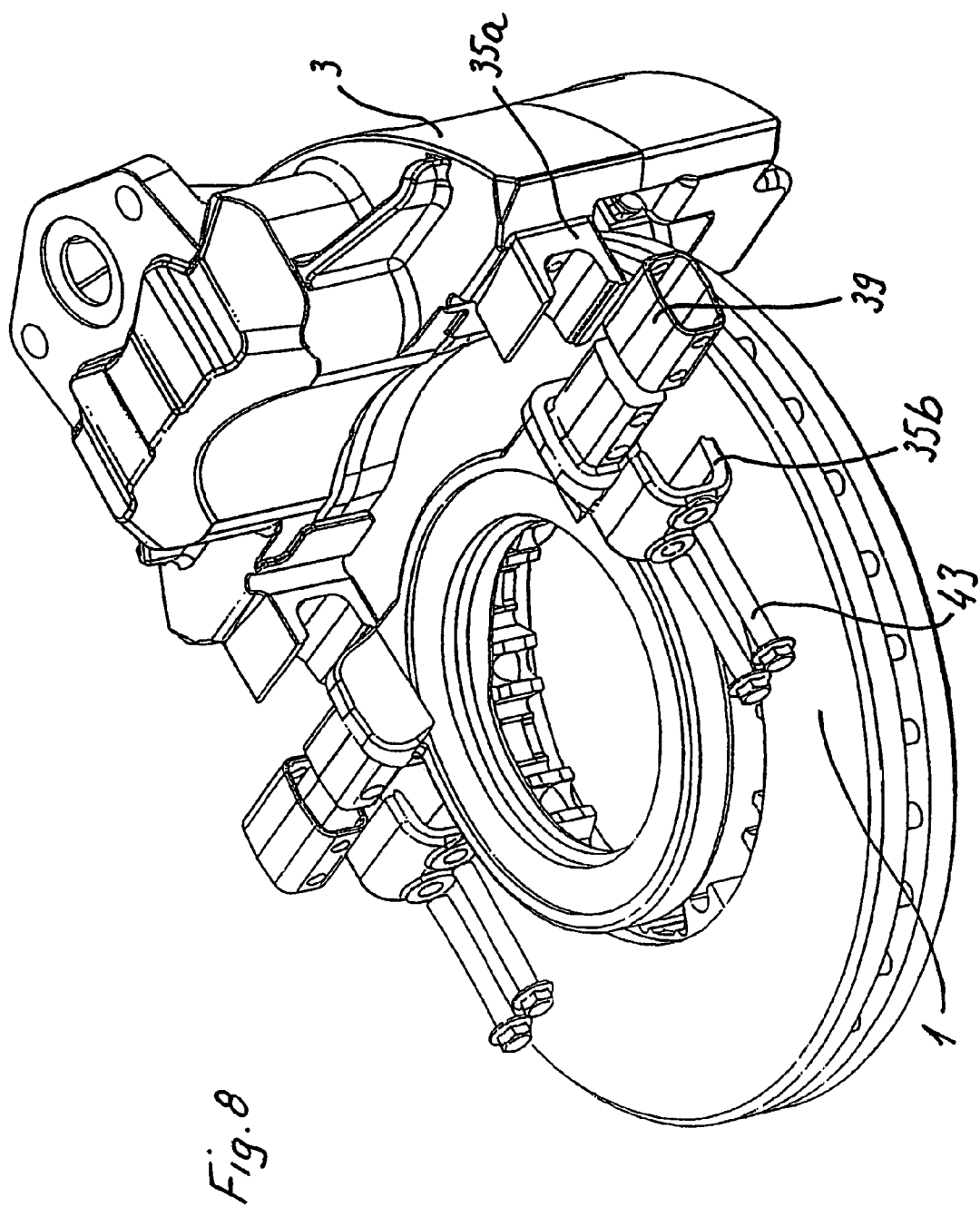
FIG. 8 is another exploded view of the embodiment of FIG. 6.
Figure 9:
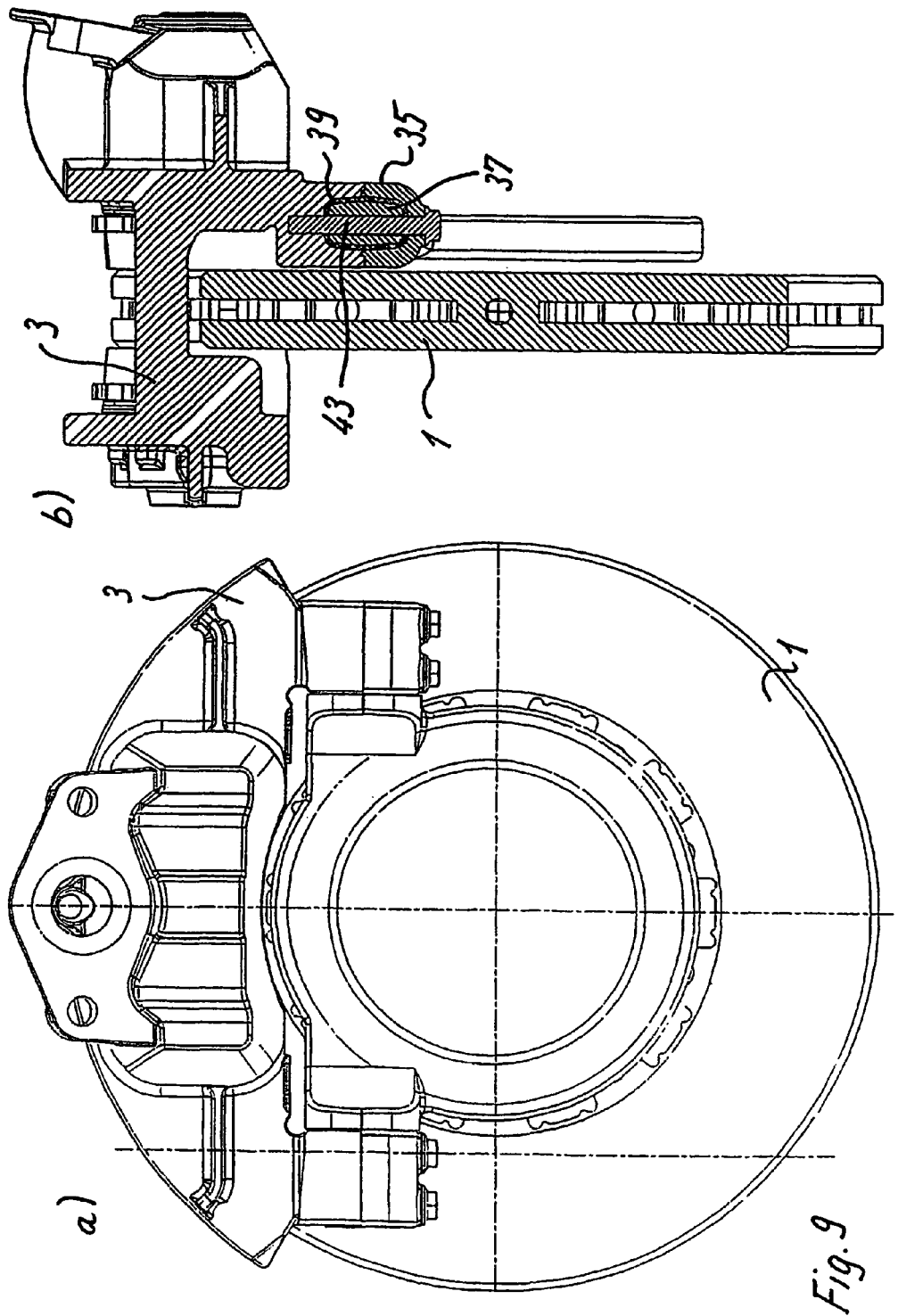
FIGS. 9a-9b include a rear view, as well as a sectional view, of the embodiment of FIG. 6.
Figure 11:
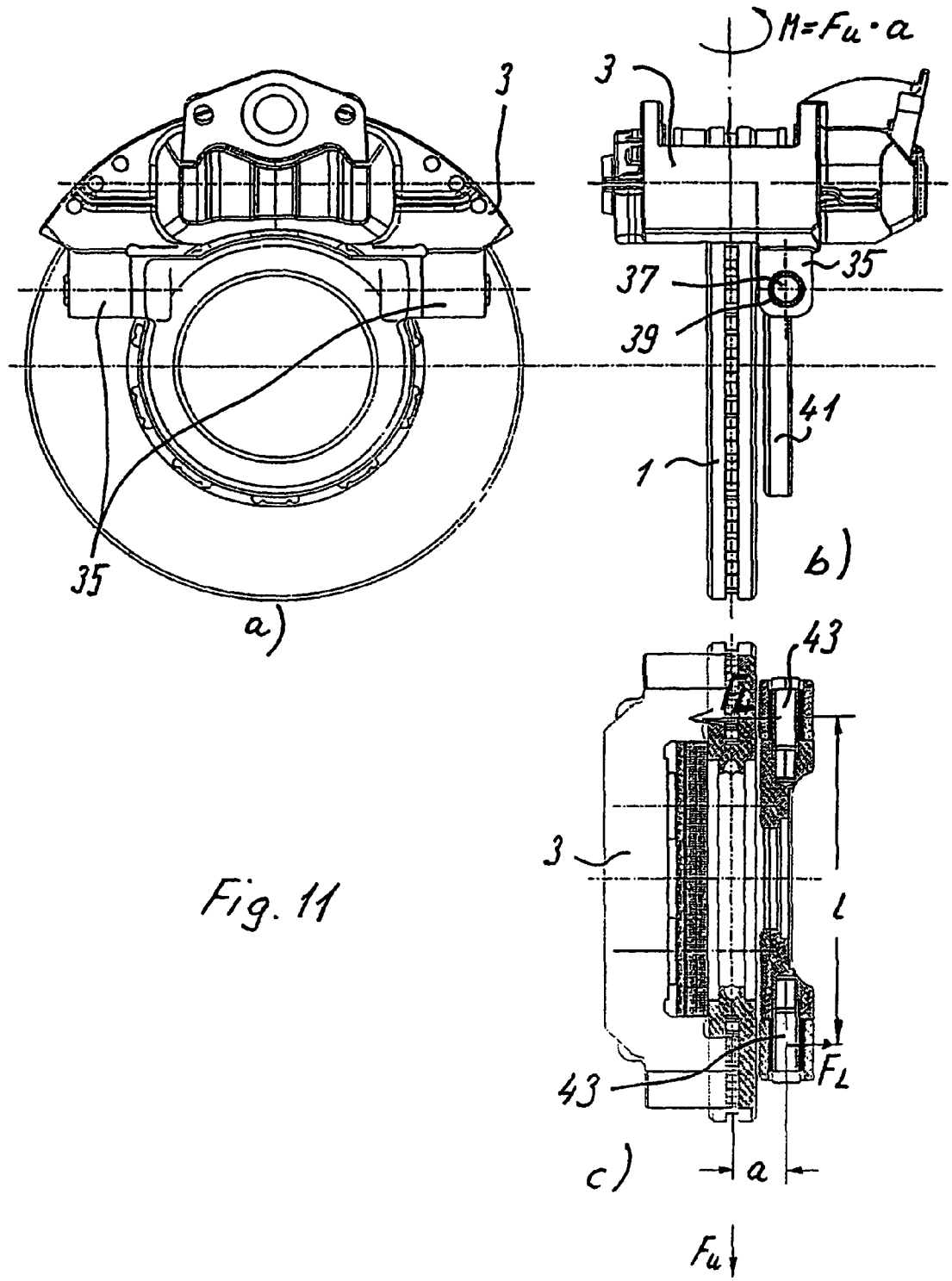
FIGS. 11a-11c are different views of another embodiment of the invention.

In contrast, the swivelling movement of the caliper takes place about the pivot center z (FIG. 4b) of the supporting elements 37 by an elastic pressing of the intermediate elements 39 (see, for example, FIG. 11). The intermediate elements 39 are particularly constructed as a one-piece molded part and preferably consist of a suitable elastomer material. In this case, they also carry out the hermetic sealing of the elastic swivel bearing toward the outside.

The embodiments of FIGS. 6 to 9 differ from those of FIGS. 1 to 5 in that the supporting elements 37 have a polygonal cross-section and engage in the bearing housings by way of an elastically deformable intermediate element 39 in the form of an elastic sleeve. The sleeve or the bush is again used as an elastically deformable intermediate element 39. During the implementation of the swivelling movement, this sleeve 39 is subjected to a pressing as well as to a shearing stress. The sleeve 39 is, preferably, again made of an elastomer.

Figure 10:
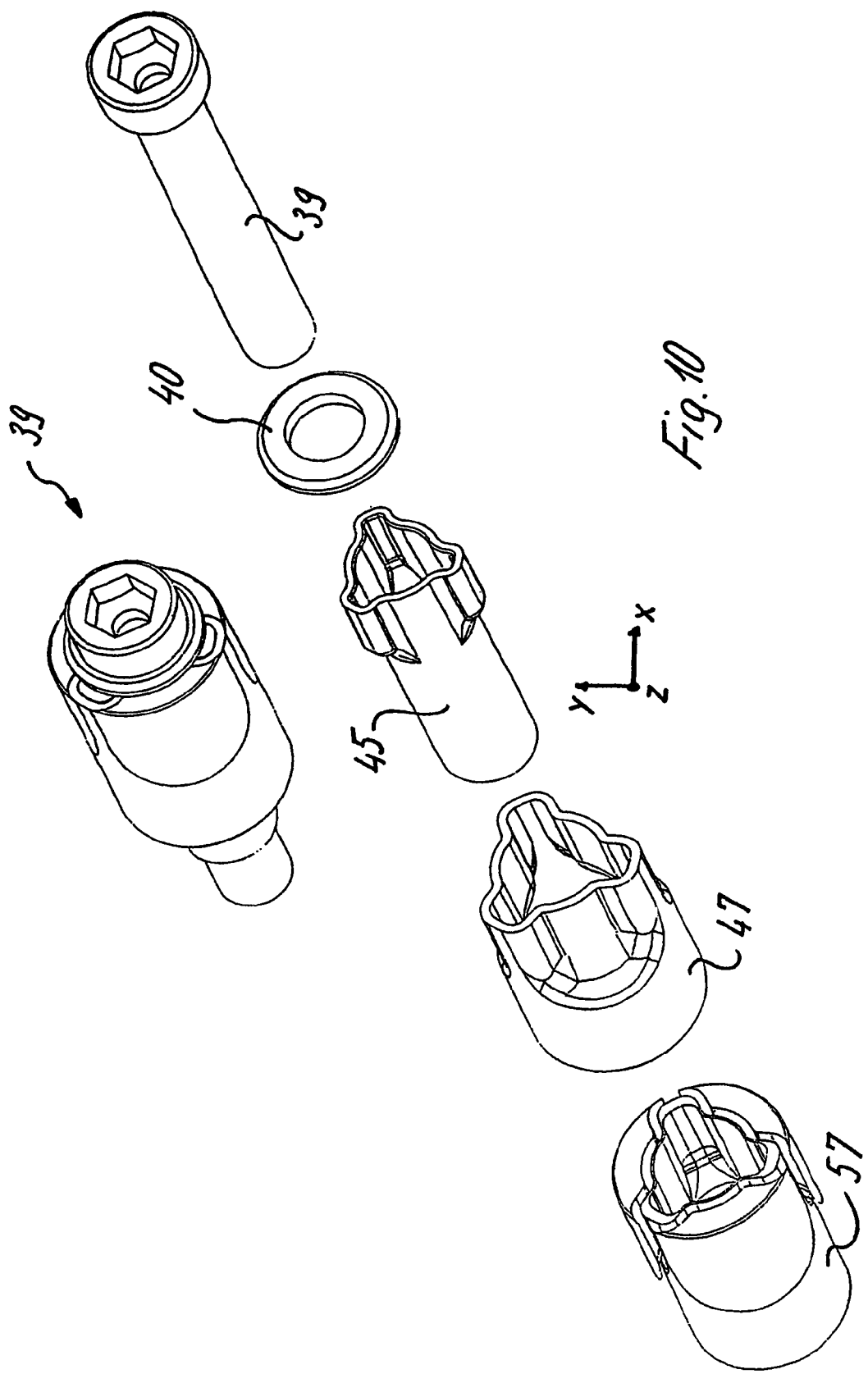
FIG. 10 is an exploded view of elements of yet another embodiment of the invention.

FIG. 10 shows an intermediate element 39 formed as a rubber-metal composite part. In this case, an inner bush 45 preferably made of a steel plate, interacts with a corresponding outer bush 47, preferably also made of steel plate, specifically preferably by way of a non-circular profile. An elastomer material 57 is injected as the elastic intermediate element 39 between the two bushes 45, 47. By way of the screw 39 with a washer 40, this ultra-bush is connected with an axle ring 41. The upper part of FIG. 10 illustrates the completely preassembled intermediate element 39.

FIG. 11 illustrates the alignment of the bearings perpendicular to the brake disc axis. FL is the bearing reaction force; L is the bearing spacing. Fu is the resulting circumferential force of both brake shoes. "a" is the shortest distance between the center plane of the brake disc 1 and the mid perpendicular between the supporting elements. The following applies in this case:

$$M=Fu*a=Fl*l$$

The bearing reaction force FL decreases the shorter the distance "a" and the larger the supporting width "L".

Figure 12:
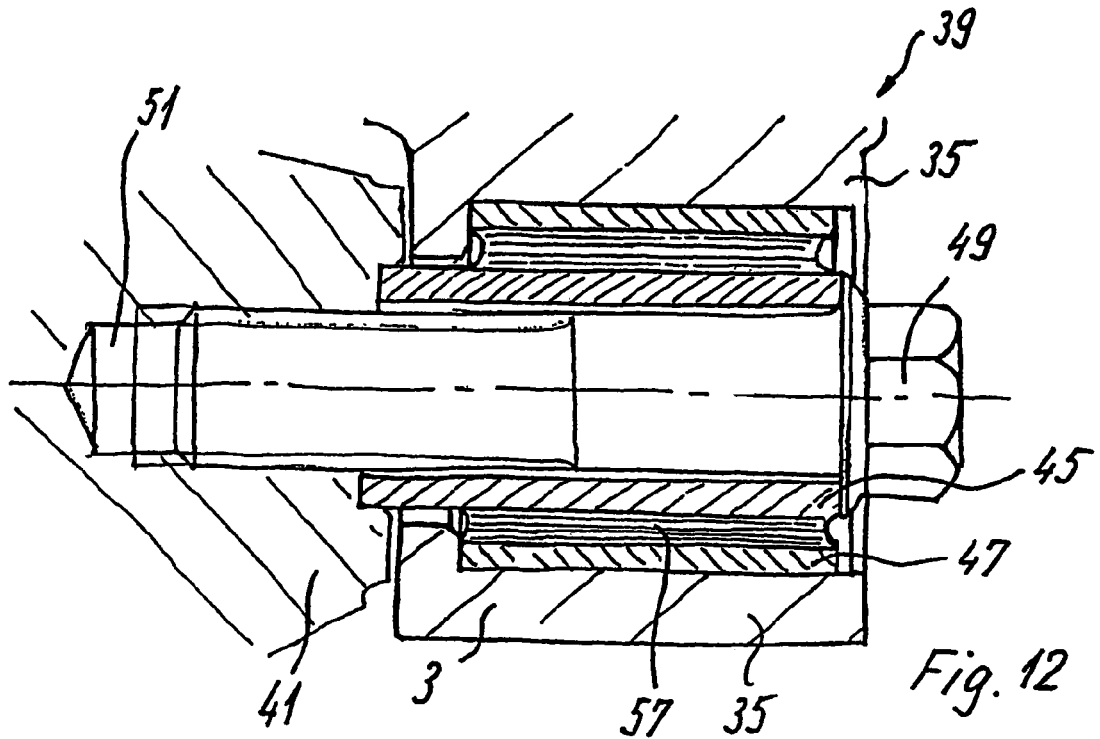
FIGS. 12 and 13 are sectional views of the connection area between the caliper and the axle ring of yet another embodiment of the invention.

FIG. 12 shows another embodiment of the invention. Here, the elastically deformable intermediate elements 39—which can be formed, for example, in the manner of FIG. 10—are again constructed as rubber-metal composite bushes (called ultra-bushes) which, by way of one screw 49 respectively having one centering attachment 51 respectively are connected with the axle, for example, an axle ring 41. The axle-side centering attachments of the screws, in turn, form the supporting elements 37. The elastomer material 57 is sprayed between the metallic inner bush 45 and an outer bush 45, 47, or is constructed as an elastomer bush.

Figure 13:
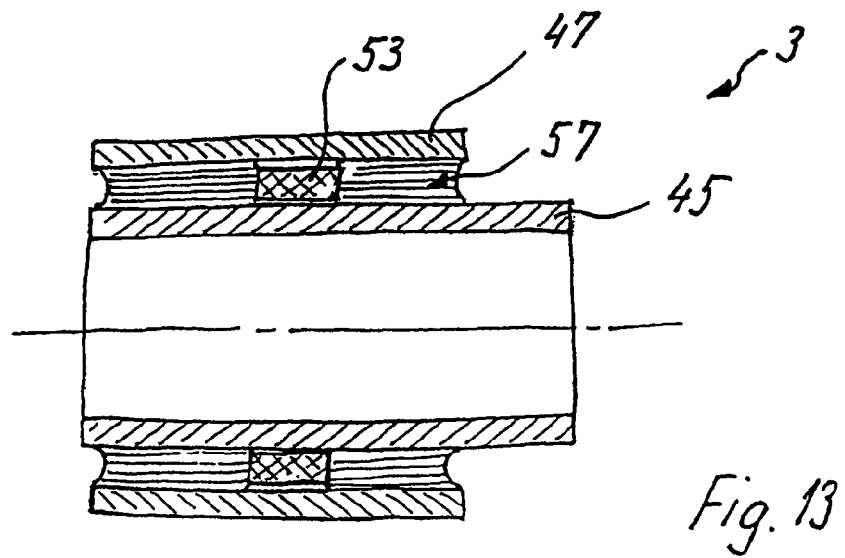

For increasing stiffness in the circumferential direction, it is advantageous, starting at a defined force acting radially upon the bearing, to cause a direct transmission of these radially acting forces for bridging the elastic intermediate element. According to FIG. 13, this is achieved in that at least one (stop) ring 53 is arranged between the inner bush and the outer bush 45, 47, here in the center. The ring 53 is selected with respect to its inside diameter such that it limits the possible relative movement between the inner bush and the outer bush; that is, a correspondingly dimensioned play exists between the stop ring 53 and the bushes 45, 47.

The ring 53 can be constructed as a separate component of a correspondingly compression-proof material. Since the ring 53 is expediently arranged in the longitudinal center between the inner bush and the outer bush in the injected elastomer, it is useful to provide the ring 53 with longitudinal grooves 55 at the inner or outer diameter or circumference, in order to thereby achieve a connection with the elastomer and a better flowing of the latter during the manufacturing process.

However, the ring 53 can also be constructed in one piece with the inner or outer bush, as a surrounding ring 53 or a ring 53 which is interrupted in segments. For implementing the swivelling movement, the inner bush is rotated with respect to the outer bush, the elastomer situated between the inner and the outer bush being subjected to an elastic shearing stress.

Returning to FIG. 14, it is pointed out that here the elastic bearing is constructed such that it is arranged coaxial with respect to the axis of symmetry of the brake disc; that is, essentially no swivelling movement takes place about a swivelling axis of the bearing but an elastic longitudinal slidability of the caliper with an elastic swivellability transversely to the longitudinal axis of the ultra-bush provided here as the bearing 59.

The elastic bearing 59 of FIG. 14a has a first elastomer section 61, an adjoining ring 63 with a play between the recess 35 and the supporting element 37, which supporting element 37 is in the form of studs, and a second elastomer section 65.

According to FIG. 14b, a third elastomer section 67 is provided instead of the ring 63, the ultra-bush again having an inner and outer bush 45, 47, the outer bush having a stepped construction, and the two outer elastomer sections, at the outer circumference and then following a stepping, framing the elastomer bush at the inner circumference.

In this case, the movement of the caliper for compensating the elasticity is not exclusively implemented as a swivelling movement, whereby particularly adaptation brakings are carried out with an almost pure longitudinal displacement of the caliper, and the only rarely occurring brakings with high braking forces require the swivelling of the caliper. This measure clearly improves the wear conditions of the brake pads and thus their useful life, because the radial displacement, particularly of the outer brake pad, occurring in the case of the hinged caliper is reduced during the braking operation and is even avoided during adaptation brakings.

TABLE OF REFERENCE NUMBERS

Brake disc 1
caliper 3
brake application device 5
opening 7
rotary lever 9
intermediate element 11
hemispherical attachment 13
slide bearing shell 14
adjusting nut 15
adjusting screw 17
thrust piece 19
pad holding plate 21
brake pad 23
holding plates 25,27
seal 29
gear wheel 31
brake pad 33
bearing housings 35
bearing recess section 35a,35b
supporting elements 37
intermediate element 39
axle ring 41
stud/bolt 43
inner bush 45
outer sleeve 47
screws 49
centering attachment 51
ring 53 longitudinal groove 55
elastomer material 57
elastic bearing 59
elastomer sections 61,65
ring 63
third elastomer section 67
bush 69

The invention claimed is:

1. A pneumatic or electromechanical disc brake, comprising:
   a) a caliper which straddles a brake disc and is swivellable or slidable relative to a wheel axle or wheel hub;
   b) a brake application device arranged in the caliper for applying the service brake, which brake application device has a rotary lever operable pneumatically or electromechanically by a piston rod;
   c) at least one adjusting device respectively arranged on each side of the brake disc;
   d) bearings, each bearing having a bearing housing and a supporting element, the bearings being arranged at a lower side of the caliper facing the wheel axle or wheel hub in an installed condition;
   e) wherein each of the bearings includes at least one elastically deformable intermediate element arranged between the bearing housing and the supporting element, which intermediate element engages in the bearing housing and is configured to be elastically deformable in each case relative to the bearing housing in a plane substantially perpendicular to the brake disc only to an extent permitting a swivelling angle or a sliding path of the caliper in a brake application direction toward the brake disc to bridge a maximal working stroke of the disc brake in an area of the brake pads; and
   f) wherein the elastic intermediate elements have a bush shape and are formed of an elastomer.

2. Disc brake according to claim 1, wherein each supporting element engages in one of the bearing housings.

3. Disc brake according to claim 1, wherein the supporting elements are molded onto the wheel axle or wheel hub.

4. Disc brake according to claim 1, wherein the supporting elements are arranged on an axle ring.

5. Disc brake according to claim 3, wherein the supporting elements have a bolt-shaped construction and are molded, at one end, onto the wheel axle or hub.

6. Disc brake according to claim 4, wherein free ends of two of the supporting elements are arranged to extend away from one another along a chord extending through the axle ring.

7. Disc brake according to claim 1, wherein supporting elements have a polygonal cross-section.

8. Disc brake according to claim 6, wherein supporting elements have a polygonal cross-section.

9. Disc brake according to claim 1, wherein the supporting elements have a cross-shaped cross-section.

10. Disc brake according to claim 6, wherein the supporting elements have a cross-shaped cross-section.

11. Disc brake according to claim 4, wherein supporting elements are constructed as studs, which can be screwed into the axle ring.

12. Disc brake according to claim 11, wherein the studs have centering attachments, which can be screwed into the axle ring.

13. Disc brake according to claim 1, wherein the bearing housings are formed of two bearing housing sections assembleable by being mutually screwed together.

14. Disc brake according to claim 1, wherein the adjusting device on each side of the brake disc has at least one adjusting rotary device.

15. Disc brake according to claim 1, wherein the adjusting device on each side of the brake disc has two adjusting rotary devices.

16. Disc brake according to claim 1, wherein the supporting elements have radial contact surfaces which are in a direct, radial-forces-transmitting contact, with a slight play, with corresponding opposite surfaces of the bearing housings.

17. Disc brake according to claim 1, wherein the supporting elements each have a slightly rounded construction at a radial outer circumference.

18. Disc brake according to claim 7, wherein the supporting elements each have a slightly rounded construction at a radial outer circumference.

19. Disc brake according to claim 9, wherein the supporting elements each have a slightly rounded construction at a radial outer circumference.

20. Disc brake according to claim 1, wherein the at least one intermediate element is a rubber-metal composite part.

21. Disc brake according to claim 1, wherein the bearings have an outer bush placed over an inner bush made of steel plate, with an elastomer material being sprayed or slid as the elastic intermediate element respectively between the two bushes.

22. Disc brake according to claim 20, wherein the rubber-metal composite part is coupled by a screw having a centering attachment with one of the wheel axle, wheel hub or axle ring so that the centering attachments of the screws form the supporting elements.

23. Disc brake according to claim 21, wherein a ring is arranged with play between the inner and outer bush, the diameter of the ring being selected such that it limits the possible relative movement between the inner bush and the outer bush.

24. Disc brake according to claim 14, wherein the adjusting rotary devices each have an adjusting nut into which an adjusting screw is screwed, a thrust piece being arranged on the adjusting nut or the adjusting screw, which thrust piece acts upon one of the brake pads.

25. Disc brake according to claim 21, wherein the inner bush and the outer bush interact by way of a non-circular profile.

26. Disc brake according to claim 21, wherein the inner bush and the outer bush have a cylindrical shape.

27. Disc brake according to claim 21, wherein the inner bush and the outer bush are formed of metal.

28. Disc brake according to claim 1, wherein the bearing housings, the supporting element and the elastic intermediate element are each aligned such that one elastic bearing respectively is constructed, which is coaxially aligned with respect to the brake disc axis.

29. Disc brake according to claim 1, wherein the bearing housings, the supporting element and the elastic intermediate element are each aligned such that one elastic bearing respectively is constructed, which is perpendicularly aligned with respect to the brake disc axis.

30. A commercial pneumatic or electromechanical disc brake having one of a pivoting and sliding caliper, comprising:
   a service brake application device arranged in the caliper on only one side of a brake disc;
   a wear adjustment device arranged on each side of the brake disc;

support bearings for mounting the caliper relative to a wheel axle in an installed condition, each of the support bearings including a bearing housing formed at an underside of the caliper, a support element engaging in the bearing housing, and an elastically deformable spacer element provided between the bearing housing and the support element; and wherein the bearings only allow for the swiveling or sliding movement of the caliper in a brake application direction toward the brake disc substantially via an elastic deformation of the elastically deformable spacer element and substantially do not allow for circumferential movement in a plane, parallel to the brake disc.

31. A mounting arrangement for a swivellable or slidable caliper of a commercial pneumatic or electromechanical disc brake, the mounting arrangement comprising:

only two bearings, said two bearings being arranged on an underside of the caliper relative to a wheel axle ring, the two bearings being arranged at mutually spaced circumferential points on a chord extending through a ring of the axle ring in order to support the caliper;

each bearing comprising a bearing housing, a support element engaging in the bearing housing, and an elastically deformable intermediate element arranged between the bearing housing and the support element, wherein the intermediate element is designed to be moveable via elastic deformation relative to the bearing housing such that only a swivel angle or a sliding path of the caliper toward the brake disc that bridges a maximal working stroke of the disc brake is permitted.

32. The mounting arrangement according to claim 31, wherein the elastic intermediate element has a bush shape.

* * * * *